(12) United States Patent
Kuhar et al.

(10) Patent No.: US 7,414,803 B2
(45) Date of Patent: Aug. 19, 2008

(54) WRITE PROTECTED MAGNETIC STORAGE MEDIA AND ASSOCIATED METHODS

(75) Inventors: James J. Kuhar, Broomfield, CO (US); Daniel R. Skaar, Denver, CO (US); Fernando Moreira, Toulouse (FR)

(73) Assignee: Quantum Corporation, San Jose, CA (US)

( * ) Notice: Subject to any disclaimer, the term of this patent is extended or adjusted under 35 U.S.C. 154(b) by 122 days.

(21) Appl. No.: 11/134,782

(22) Filed: May 19, 2005

(65) Prior Publication Data
US 2006/0262441 A1  Nov. 23, 2006

(51) Int. Cl.
*G11B 19/04* (2006.01)

(52) U.S. Cl. .................... 360/60; 360/48; 360/77.12

(58) Field of Classification Search ........ None
See application file for complete search history.

(56) References Cited

U.S. PATENT DOCUMENTS

| | | | | |
|---|---|---|---|---|
| 5,265,082 | A * | 11/1993 | Gniewek et al. | 369/53.45 |
| 5,535,188 | A * | 7/1996 | Dang et al. | 369/53.21 |
| 5,550,684 | A * | 8/1996 | Shih et al. | 360/48 |
| 5,587,804 | A * | 12/1996 | Moon et al. | 386/2 |
| 5,592,342 | A | 1/1997 | Hall et al. | |
| 5,892,633 | A * | 4/1999 | Ayres et al. | 360/73.08 |
| 6,018,434 | A | 1/2000 | Saliba | |
| 6,023,388 | A * | 2/2000 | Ikeda et al. | 360/72.1 |
| 6,084,731 | A * | 7/2000 | Uchida et al. | 360/48 |
| 6,095,445 | A | 8/2000 | Hentrich | |
| 6,104,501 | A * | 8/2000 | Yoshida et al. | 358/1.7 |
| 6,134,204 | A * | 10/2000 | Taugher | 369/59.25 |
| 6,282,040 | B1 * | 8/2001 | Bartlett | 360/48 |
| 6,339,810 | B1 | 1/2002 | Basham et al. | |
| 6,433,951 | B1 * | 8/2002 | Lubratt | 360/77.12 |
| 6,526,482 | B1 | 2/2003 | Nonoyama et al. | |
| 6,684,199 | B1 * | 1/2004 | Stebbings | 705/57 |
| 6,724,554 | B1 * | 4/2004 | Braithwaite et al. | 360/60 |
| 6,724,705 | B1 * | 4/2004 | Ko et al. | 369/53.21 |
| 6,745,640 | B2 * | 6/2004 | Nguyen | 74/425 |
| 6,765,739 | B2 * | 7/2004 | Hogan et al. | 360/60 |

(Continued)

OTHER PUBLICATIONS

Author Unknown. "StorageTek Volsafe Solution," press release located at <http//www.storagetek.shareholder.com/news>, last visited on Jan. 6, 2004, 2 pages total.

(Continued)

*Primary Examiner*—Hoa T. Nguyen
*Assistant Examiner*—Dismery Mercedes
(74) *Attorney, Agent, or Firm*—Morrison & Foerster LLP

(57) ABSTRACT

According to one aspect and example, a method is provided for handling write protected storage devices. The method includes generating a read signal from a portion of a magnetic storage medium and determining if a modulation pattern is present in the read signal, the modulation pattern associated with an identification mark comprising a pattern of indicia associated with a recording layer of the magnetic storage medium. The identification mark indicates that the storage medium is a write protected storage device (e.g., a write-once-read-many "WORM" storage device or the like). If the storage medium is write protected, a media drive is restricted from write operations to the storage medium according to the particular write protected scheme, e.g., WORM, write append only, or the like.

7 Claims, 6 Drawing Sheets

U.S. PATENT DOCUMENTS

| | | | |
|---|---|---|---|
| 6,779,080 B2* | 8/2004 | Basham et al. | 711/112 |
| 6,904,495 B2* | 6/2005 | Frantz et al. | 711/111 |
| 6,947,237 B2* | 9/2005 | Christie, Jr. | 360/60 |
| 2002/0035665 A1 | 3/2002 | Basham et al. | |
| 2003/0002188 A1 | 1/2003 | Bliss et al. | |
| 2003/0043492 A1 | 3/2003 | Chan et al. | |
| 2003/0067701 A1 | 4/2003 | Christie, Jr. | |
| 2003/0089809 A1 | 5/2003 | Maekawa et al. | |
| 2003/0126359 A1* | 7/2003 | Debiez et al. | 711/112 |
| 2003/0126446 A1 | 7/2003 | Debiez et al. | |

OTHER PUBLICATIONS

Sony. "AIT-Worm. Optimum for Legal Document Archives: Ever-Increasing Need for Large-Capacity, High-Speed Write-Once Solutions," StorageTek Volsafe Solution, Product description located at <http//www.sony.net/Products/Storagesolutions/edv027.html>, last visited on Jan. 6, 2004, 4 pages total.

U.S. Appl. No. 10/826,639 filed Apr. 15, 2004 by George A. Saliba et al., 22 pages.

U.S. Appl. No. 10/854,078 filed May 24, 2004 by John A. Koski et al., 42 pages.

* cited by examiner

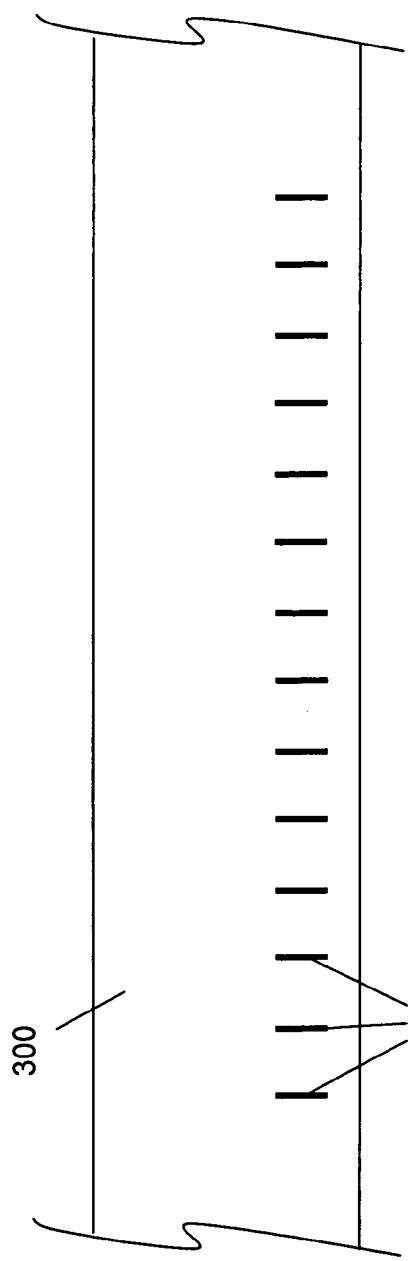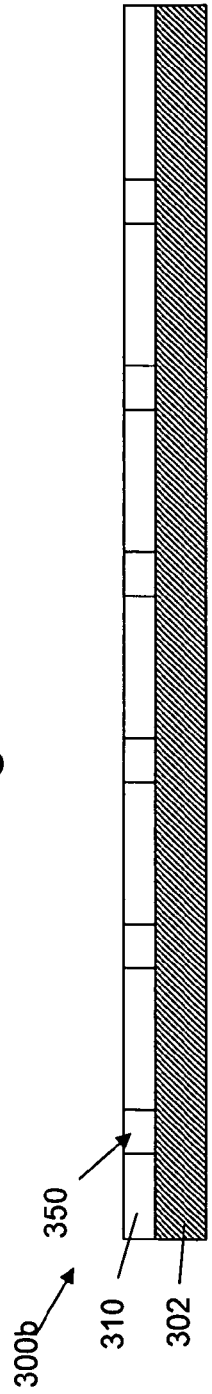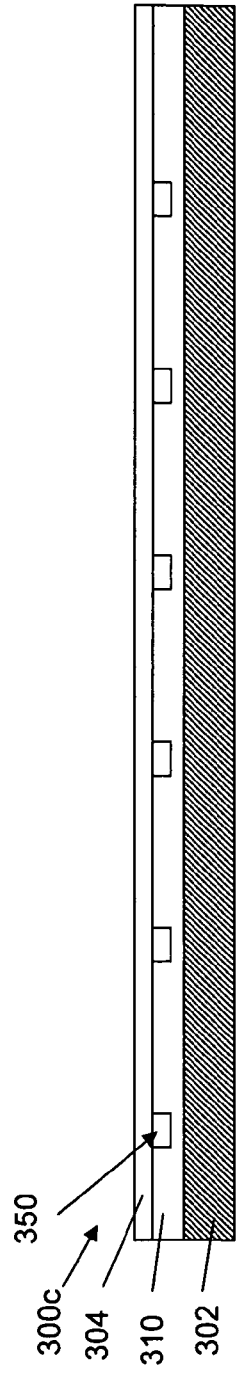

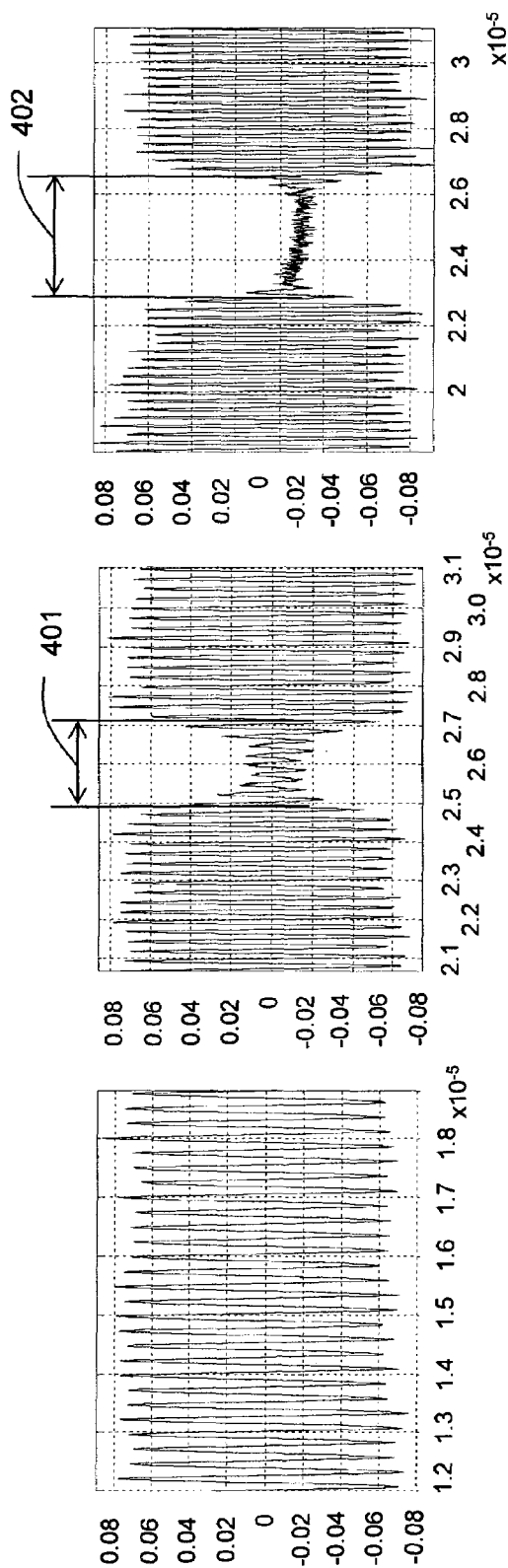
Figure 4A
Figure 4B
Figure 4C
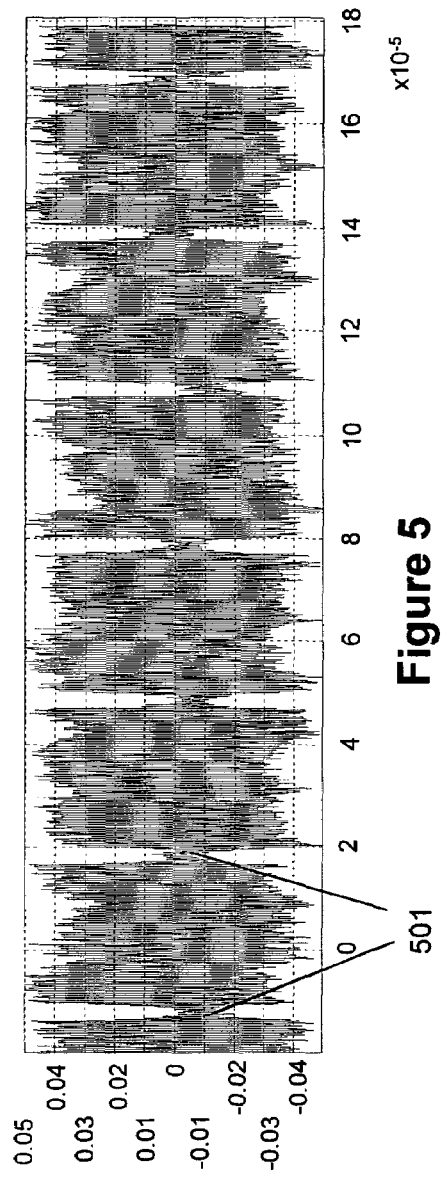
Figure 5

WRITE PROTECTED MAGNETIC STORAGE MEDIA AND ASSOCIATED METHODS

BACKGROUND

1. Field of the Invention

Various examples described herein relate generally to magnetic storage devices and systems, and more particularly to methods and systems for write protected or archival magnetic storage devices.

2. Description of the Related Art

Magnetic storage devices remain a viable solution for the storage and retrieval of large amounts of data. The use of half-inch magnetic tape cartridges, e.g., such as digital linear tape ("DLT") or linear tape open ("LTO") formats, is well known in the art. Generally, a magnetic storage tape is streamed by a magnetic data transducer head and data is recorded along multiple closely spaced tracks on the tape. The tape may be similarly streamed by the transducer head to read back the stored data. Magnetic storage devices are generally read/write capable and may be erased and written over many times during their lifetime.

In some instances users desire to store data in a non rewritable manner, e.g., such that the data is recorded to the storage device and further writing to the storage device is prevented. This format is typically referred to as a Write Once Read Many (or "WORM") format. Typically, WORM formatted storage devices allow a single write operation and are thereafter a read-only storage device. For example, after data is written to the storage medium of the device, the data cannot be erased, modified, or overwritten by the drive. Optical storage devices such as compact discs are more frequently utilized as WORM media because they generally store information in a permanent form by creating non-removable pits in the media surface.

WORM storage devices are often desirable for protection against accidental or intentional modifications of the data. In other cases, WORM storage devices may be used to satisfy certain regulatory agencies, e.g., relating to financial or medical data storage uses. Accordingly, WORM storage devices are often referred to as "archival" storage devices, where the intent is that the stored data remain secure and unaltered.

Traditionally, data preservation problems have been addressed by providing physical switches, locks, slides, or the like that prevent a drive from recording to a storage medium after the switch has been moved to a WORM mode. For example, a drive may record information to the storage device with the switch in a first position allowing the drive to write to the storage device. Moving the switch to a second write protected position makes the storage device "read-only," e.g., where a suitable drive recognizes the write protected position and is prevented from writing to the storage device. Standard magnetic tape cartridges, such as DLT cartridges, include a record switch that when in a proper position prevents a DLT drive from writing to the storage tape and thereby allows a DLT tape to become read only. The record slide switch, however, may be intentionally or inadvertently reversed to make the storage device writeable once again. Once the storage device is writeable, data stored thereon can be easily lost or altered if the system overwrites new data over the previously stored data.

Archival storage functions are often satisfied with special cartridges (distinct from standard read/write cartridges) that are compatible with distinct tape drives. For example, a cartridge may include certain characteristics such as size, surface features, cartridge leader features, data format, and the like to be recognized by the drive as a WORM device. Such systems are generally undesirable because of the additional cost of using separate cartridges and/or drives to perform write protected or archival functions.

U.S. Pat. No. 5,265,082 describes a write-once-only media consisting of a watermark that is magnetically recorded on the storage medium at the factory, with a portion of the mark detectable by the system and a portion of the mark detectable by returning to an inspection station for verification. In such a system, however, the storage medium can be bulk erased, including the magnetically recorded watermark, thereby removing the stored data and the indication that the medium is intended as a write protected device, e.g., a WORM device.

BRIEF SUMMARY

In one aspect described herein, methods for operating a magnetic storage media drive are provided. In one example, a method includes generating a read signal from a read element associated with a transducer head, the read signal generated from a portion of a magnetic storage medium. The method further includes determining if a modulation pattern is present in the read signal, the modulation pattern associated with an identification mark comprising a pattern of indicia formed with a recording layer of the magnetic storage medium. In one example, the identification mark indicates that the storage medium is a write protected storage device (e.g., a write-once-read-many "WORM" storage device or the like). If the storage medium is write protected, the method further includes restricting write operations to the storage medium according to the particular write protected scheme, e.g., WORM, write append only, or the like.

The read signal may be generated from a magnetically recorded signal written over a pattern of indicia formed in the recording layer, where the pattern of indicia result in a corresponding pattern of dropouts in the read signal. The pattern of indicia may include at least partially recessed or etched regions of a magnetic recording layer of the storage medium similar to optical servo marks, which modulate the generated read signal. The signal written over the pattern of indicia may include format data, user data, dc signals, high/low frequency tone signals, and the like.

In another aspect, magnetic storage media drive systems are provided to perform read and/or write operations to magnetic storage devices. In one example, a system is configured to operate by receiving a write request and associated write data from a host and determine if a storage medium is write protected. The system determines if the storage medium is write protected by reading a portion of the storage medium where an identification mark would be present, e.g., before the beginning of tape marker or the like. If the storage medium is write protected, as determined, for example, by a detected pattern of signal modulations associated with a write protected storage device, the system may handle the write request according to the particular write protected scheme (e.g., restricting or preventing the write request). Conversely, if the storage medium is not indicated to be write protected, the media drive may handle the write request conventionally.

In another aspect and example described herein, a magnetic storage medium is provided. In one example, the magnetic storage medium includes a magnetic recording layer for storing data. The magnetic recording layer further includes a pattern of indicia (e.g., recessed or etched regions) associated therewith. In one example, the pattern of indicia results in a discernable modulation pattern in a read signal generated by a read element. For example, a read signal resulting from a magnetic read head passing over the storage medium may include a pattern of modulations or dropouts in the read signal associated with the pattern of indicia. The pattern may indicate a characteristic of the storage medium, e.g., that the storage medium is (or alternatively, is not) write protected storage medium such as a WORM device or the like.

In another aspect, a computer readable storage medium containing computer executable code for operating a magnetic storage drive to conduct read and/or write operations upon magnetic storage devices is provided. The computer executable code may instruct the magnetic storage media drive to read a portion of the storage device and determine if a predefined modulation or dropout pattern is present in a generated read signal to identify the status of the storage device, e.g., as write protected. The magnetic storage drive may further be instructed to perform write operations based on the determined status of the storage device as described.

The present invention and its various embodiments are better understood upon consideration of the detailed description below in conjunction with the accompanying drawings and claims.

BRIEF DESCRIPTION OF DRAWINGS

FIG. 3A illustrates an exemplary pattern of detectable indicia on a magnetic storage medium;

FIGS. 3B and 3C illustrate cross-sectional views of exemplary magnetic storage media including detectable indicia thereon;

FIGS. 4A-4C illustrate generated read signals associated with various magnetic storage media with and without indicia;

FIG. 5 illustrates a generated read signal from a magnetic storage medium including a pattern of indicia;

DETAILED DESCRIPTION

Figure 2:
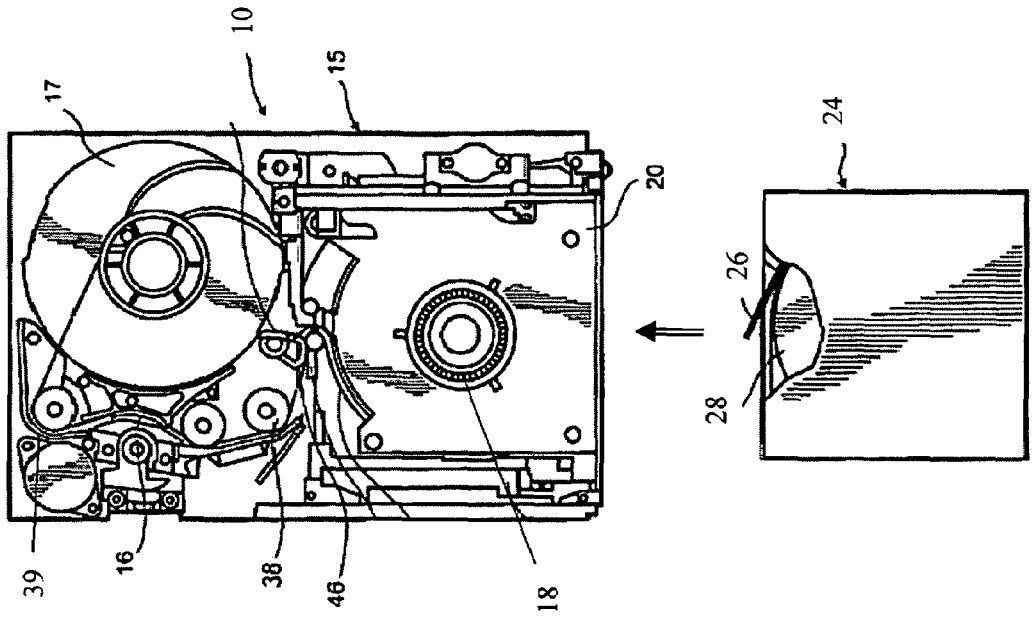
FIG. 2 illustrates an exemplary tape drive system for the storage and retrieval of data from magnetic storage devices.

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

According to one aspect and example provided herein, a storage system and method are described for handling write protected magnetic storage devices, e.g., tape cartridges or the like, wherein the write protected devices include an identification mark that provides for write protected detection, authentication, and protection of stored data. The identification mark may include a pattern of indicia formed with the recording layer of the storage medium that may be detected by a read element of the drive. Once detected the drive handles the storage device as a write protected device.

In one example, the pattern of indicia includes recessed regions in the recording layer which are overwritten with a magnetically recorded signal. When the signal is read by a read element of the drive, the drive will detect the identification mark as a series of modulations or dropouts in the read signal and identify the storage device as a write protected storage device such as a write-once-read-many (WORM) device. For example, the duration, frequency, and number of signal modulations may be measured to allow the drive firmware to identify the status of the device, e.g., write protected, and perform read and/or write operations according to an associated write protected scheme. The identification mark, comprising the pattern of indicia, may be detected by the drive read head without additional sensors (e.g., optical, magnetic, mechanical, or the like).

In one example, a magnetic storage medium includes a magnetic surface or recording layer that is etched by a laser, for example, to form a series of indicia comprising recessed or removed regions in the magnetic recording layer. The indicia may be laser etched into the magnetic storage medium similar to the formation of optical servo marks. An identification mark that is etched or otherwise physically formed in the recording layer cannot be bulk erased by degaussing, for example. In particular, tracks or signals used to detect the identification mark as well as other data may be erased, but the identification mark itself will still be present and discoverable.

Various additional write protected schemes and drive-level or host-level processing may be carried out based on a detected pattern of indicia. For example, various drive level processing systems that may be used in conjunction with systems and methods herein are described, e.g., in U.S. patent application Ser. No. 10/826,639, entitled "Methods and Systems for Overwrite Protected Storage Media," which is hereby incorporated by reference in its entirety. Additionally, the identification mark may be used to identify the status of devices for use in other applications other than write protected schemes described herein.

Figure 1:
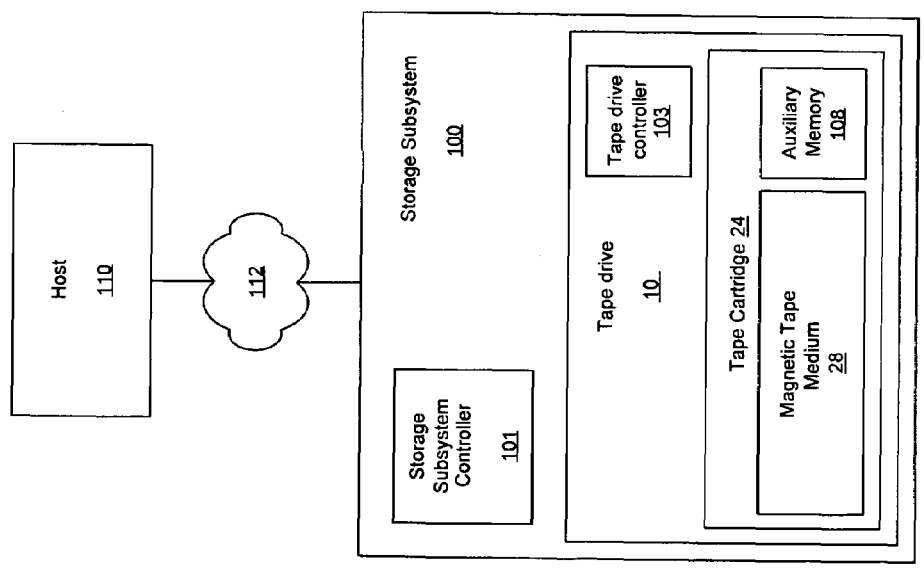
FIG. 1 illustrates an exemplary storage system.

Storage systems, such as magnetic tape libraries, are widely used for storing information in digital form. An exemplary tape storage subsystem 100 is illustrated in FIG. 1. Storage system 100 is presented for illustrative purposes, and is not intended to be limiting. Storage subsystems 100 may include a storage subsystem controller 101 for controlling one or more tape drives 10 contained within the storage subsystem 100 and for controlling other components of the storage subsystem 100, such as the tape picker, which is used to select and load tape cartridges 24 into the tape drives 10. The storage subsystem 100 may be coupled to a host system 110, which transmits I/O requests to the storage subsystem 100 via a host/storage connection 112.

Tape drive 10 reads and writes data to the primary storage medium, shown in FIG. 1 as a magnetic tape medium 28 contained within a removable magnetic tape cartridge 24. Cartridge 24 may additionally include an auxiliary memory device 108 (or emulated auxiliary memory storage stored on medium 28) as is known in the art. With reference to FIG. 2, exemplary tape drive 10 is illustrated in greater detail. Tape drive 10 includes a tape drive housing 15, a data transducer, i.e., read and/or write head 16, a take-up reel 17, and a receiver 20. Tape drive 10 is used in conjunction with a cartridge 24 which houses a storage tape 28 on a supply reel (not shown). Receiver slot 20 is configured to receive a suitable cartridge 24 therein adjacent reel driver 18. Tape drive 10 may also include a door and various mechanisms for receiving and ejecting cartridge 24. When cartridge 24 is received in receiver slot 20 a buckler mechanism 46 or the like may engage a cartridge leader 26 and stream storage tape along a tape path within tape drive 10 passing read/write head 16 and onto take-up reel 17. The tape path may include various tape guides 39, rollers 38, one or more read/write heads 16, and the like before being wound upon take-up reel 17.

Cartridge 24 generally includes a substantially rectangular cartridge housing which encloses cartridge leader 26 and storage tape. Cartridge 24 may further include a cartridge door to protect storage tape 28 therein and a cartridge leader 26, which is exposed when the door is open. Storage tape 28 generally includes a thin film or layer of magnetic material that may store information in a form, e.g., digital, that may be subsequently retrieved if desired. Storage tape 28 may be approximately one-half inch in width and have a thickness of approximately 0.5 mils (0.0005 inch) or thinner. Typically, storage tape includes a storage surface on one side of storage tape that may be divided into a plurality of parallel tracks along the length of storage tape 28. Alternatively, the data may be recorded in diagonal strips across storage tape 28.

Various other features of a tape drive may be included, for example, various buckler systems, rollers, tape guides, receiving mechanisms, dampers, and the like may be used. Representative magnetic tape drive for which exemplary methods and system may be used are sold by Quantum Corporation under the trademarks SDLT™ 220, 320, 600 and VS.

FIG. 3A illustrates a major side of tape medium 300 and a write protected identification mark comprised of a pattern of indicia 350 formed thereon. The pattern of indicia 350 may be positioned on various segments or regions of tape medium 300, which are accessible by a drive read head, including any of the data or format regions described below with reference to FIG. 6.

In one example, the identification mark is included in a portion of the medium generally associated with calibration data such that when the tape is first received by a media drive, firmware associated with the drive will coordinate writing calibration tracks over the identification marks. When the calibration tracks are read on subsequent reads when loaded, the channel will detect the identification mark as a series of dropouts in the read signal and recognize that the storage device is write protected. The dropouts can be timed, e.g., using a Media Access Controller ("MAC") chip or the like in the drive system. The duration and amount of dropouts will allow the drive firmware to distinguish a write protected storage device from a non-write protected storage device.

In one example, the identification mark includes a series of vertical lines, shown as indicia 350, patterned longitudinally along a portion of a magnetic tape. The pattern of indicia 350, e.g., the number, spacing, width, etc., of indicia 350 may be varied as desired.

In one example, each indicium 350 may be formed to extend substantially or entirely across the width of tape medium 300. In other examples, however, each indicium 350 may extend a vertical distance comparable to the dimensions of a corresponding drive read element. For example, the vertical distance of indicia 350 may be equal to or slightly larger than a corresponding read element, e.g., 100-400 μm. The spacing or pitch of indicia may vary, for example, between 1-500 μm. Generally, it is desired that the indicia be of sufficient width and separation to modulate a read signal and be detectable within the read signal. It is noted that dimensions of indicia 350 are provided for illustration and smaller or larger dimensions of indicia 350 are possible and contemplated. Further, various other patterns of indicia are possible, and in other examples, indicia 350 may be orientated at an angle to the vertical direction or include non-linear lines or patterns.

The width and/or spacing between indicia 350 may further be varied to encode information on magnetic storage medium 300. For example, each indicium 350 might be slightly offset from a predefined pitch (or the width of each indicium 350 varied) to encode information such as the date or source of manufacture of the storage device, to distinguish two or more types of write protected media, or the like. A similar encoding scheme is described in relation to magnetic servo marks in co-pending patent application Ser. No. 10/854,078, entitled "SERVO TRACK HAVING PERIODIC FRAMES OF TONE FIELD AND EMBEDDED SYNCHRONIZATION MARKS," filed on May 24, 2004, which is incorporated by reference herein in its entirety.

FIGS. 3B and 3C illustrate exemplary cross-sectional views of tape medium 300b and 300c along a longitudinal direction. Tape medium 300b includes a base layer 302 and a recording layer 310. Recording layer 310 includes indicia 350 formed therein. In this particular example, indicia 350 are recessed entirely through recording layer 310 to base layer 302. In other examples, indicia 350 are recessed only partially into recording layer 310.

FIG. 3C illustrates another exemplary tape medium 300c, where recording layer 310 is formed on base layer 302 and indicium 350 are partial recessed in recording layer 310. The depth and shape of the recess in recording layer 310 forming indicium 350 may be varied to result in a desired modulation of a subsequent read signal.

Additionally, tape medium 300c includes a protective coating 304 formed over recording layer 310 and indicium 350. Those of ordinary skill in the art will recognize that tape medium 300 may include numerous other configurations, layers, and features not specifically described herein.

In the above examples, base layer 302 may include a plastic substrate such as PolyEthylene Terephthalate (PET), PolyEthylene Naphthalene (PEN), PolyAramid (PA), or the like. Typically, base layer 302 provides a rigid base for the magnetic recording layer 310. Magnetic recording layer 310 may include gamma ferric oxide, chromium dioxide, Metal Powder (MP) or any other suitable material(s) for magnetically recording and storing information.

FIGS. 4A-4C and 5 illustrate various exemplary read signals generated from a read element associated with a transducer head, the read signal generated from a portion of a magnetic storage medium. FIG. 4A illustrates a read signal generated in response to a signal recorded on a magnetic storage medium. In this instance, the portion of the magnetic storage medium includes a relatively high frequency signal, but does not include indicia that result in a modulation of the read signal. Accordingly, the read signal is substantially uniform.

FIG. 4B illustrates a read signal generated in response to a read signal recorded to a magnetic storage medium at a similar frequency as FIG. 4A, wherein a portion of the recording layer in this example is partially recessed (e.g., the recording layer is partially etched or otherwise removed) to form an indicium. The generated read signal includes a reduced amplitude section 401 corresponding to the partially recessed portion of the recording layer. The signal frequency is still detectable in the reduced amplitude section 401, but the presence of the indicia formed in the recording layer is detectable within the read signal. Accordingly, each indicium need only be recessed or otherwise altered to modulate the read signal sufficiently to be detected in a generated read signal.

FIG. 4C illustrates another exemplary read signal generated in response to a signal recorded to a magnetic storage medium at a similar frequency as FIG. 4A, wherein a portion of the recording layer in this example has been removed entirely, e.g., etched through to an underlying layer. The read signal includes a reduced, nearly absent, section 402 corresponding to the indicium formed with the recording layer.

Accordingly, the signal modulation or dropout in the read signal corresponding to the indicium in the recording layer is more defined than that of FIG. 4B. For example, a width of the indicium is more clearly defined.

FIG. 5 illustrates an exemplary read signal generated from a read head reading a signal recorded over a pattern of indicia formed in the recording layer of a magnetic tape medium. Equally spaced modulations of the read signal, as shown by the reduced amplitude regions 501, may be detected by the drive system and used to identify the storage device as described herein. Additionally, the distance between indicia, as detected by the time between signal modulations, may further be varied to encode or provide additional information to a drive system.

Figure 6:
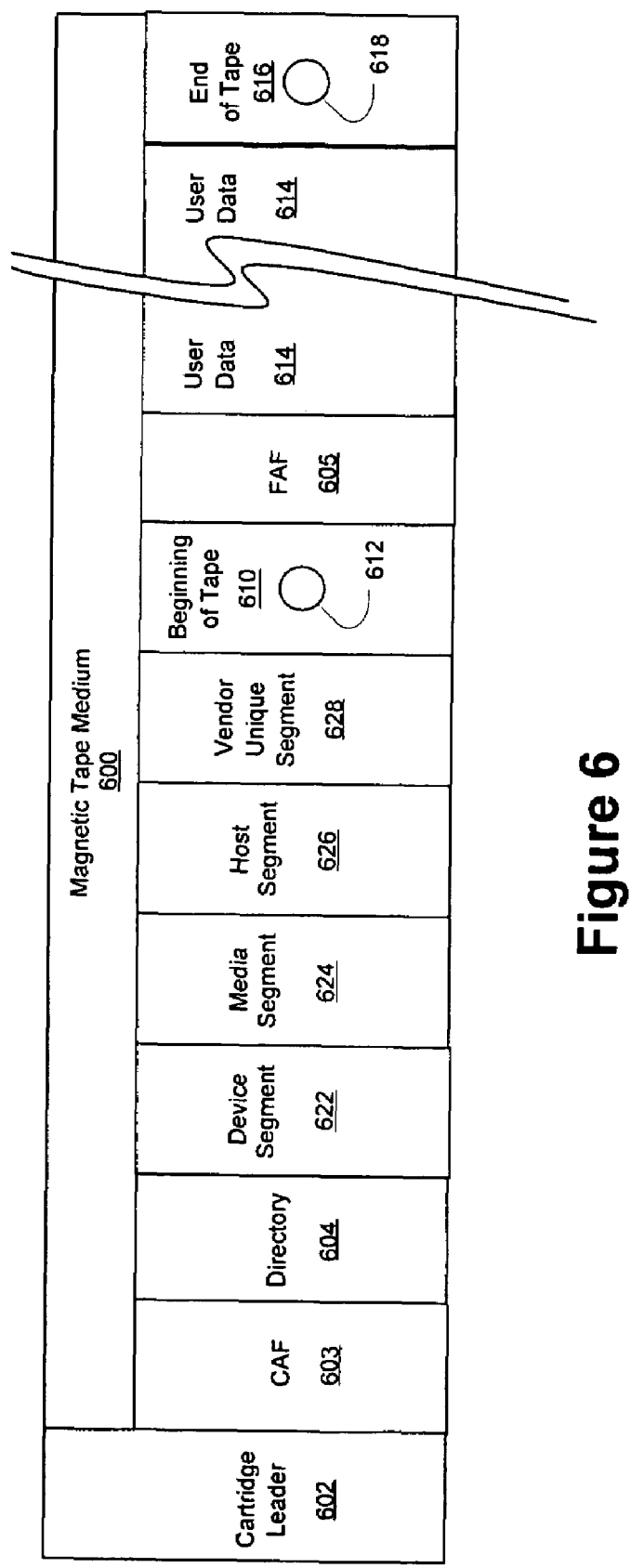
FIG. 6 illustrates a block diagram illustrating a magnetic storage medium.

FIG. 6 illustrates a block diagram of an exemplary formatted magnetic storage medium 600. At the beginning of the magnetic tape medium 600 is the cartridge leader 602. The cartridge leader 602 is configured to couple to a buckle mechanism of a drive leader of a tape drive and is not used to store data. Typically a Coarse Alignment Field ("CAF") region 603 and Fine Alignment Field ("FAF") region 605 are included to assist in initial drive magnetic to optical calibration processes. Within these regions various directory and format data is generally written; for example, a directory region 604 that stores conventional directory data used to enable a tape drive to access user data in an efficient manner.

In one example, the indication mark is included in one or more of the data segments written to tape medium 600 prior to the Beginning of Tape "BOT" hole(s), e.g., associated with the format of the storage device such as the CAF region 603 or directory region 604. Generally, when an unformatted storage device, e.g., a tape cartridge, is loaded into a media drive, format data is written in this region over the indication mark and then read back by the drive. The drive will thereby detect the indication mark in the read signal. On subsequent loads of previously formatted storage devices, the calibration data will be read and an identification mark (if present) detected.

In other examples, the indication mark may be included with any portion of the magnetic tape and a magnetic feature (e.g., format or user data, a tone field, a high/low frequency signal, dc-signal, or the like) may overwrite the pattern of indicia such that upon reading the magnetic feature with a drive read element, the pattern of indicia are discernable from the read signal as signal modulations, e.g., dropouts in the signal.

Additional segments may also be included in the exemplary data format shown in FIG. 6. For example, media segment 624 can be used to store attributes of the magnetic tape medium 600. These attributes can include, for example, the tape manufacturer's identity, the production date, or other information relating to the identity of the tape medium 600. Host segment 626 can be used to store host attributes. These host attributes may include any data which the host may wish to store. This can include, for example, a tape label, a date stamp, and information identifying the host writing the data to the tape cartridge. It may be desired to provide unlimited read and write access to the host segment 626. Device segment 622 may be used to store performance information including error data relating to the cartridge, drive history information, and other predictive failure information.

After the beginning of tape region 610, which is indicated by a beginning of tape hole 612. A FAF region 605 is positioned adjacent the beginning of tape region 610 to assist in calibration. In operation, a tape drive searches for the beginning of tape hole 612 to determine where to begin storing the user data in the user data region 614. After the user data region 614 is an end of tape region 616 marked by an end of tape hole 618.

It is noted that FIG. 6 is not to scale; in typical tape cartridges, the user data region 614 consumes the vast majority of the length of the magnetic tape medium 600. Those of ordinary skill in the art will recognized the data segments shown and described are illustrative only and that similar data segments may apply to other magnetic storage medium. An exemplary storage medium may include fewer or additional data segments. Additionally, one or more of the data segments shown and described may be included in an auxiliary memory device associated with the storage device or formatted to emulate an auxiliary memory device.

Figure 7:
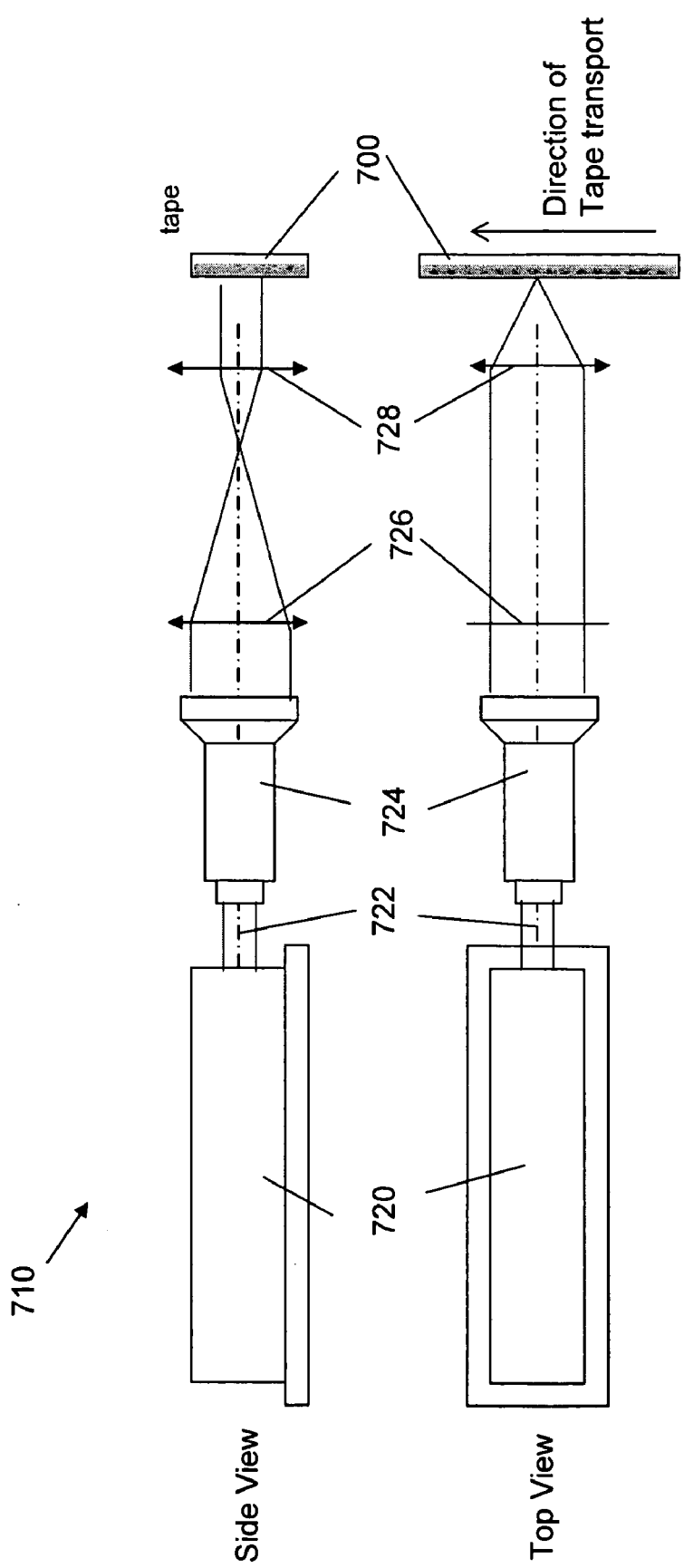
FIG. 7 illustrates an exemplary system for forming a pattern of indicia on magnetic storage media.

FIG. 7 illustrates an exemplary system for forming an identification mark on a magnetic storage layer of a magnetic storage device. In this example, a pulsed solid state laser etching system is shown. It should be recognized, however, that various other etching systems may be used, e.g., laser diode systems, continuous laser systems, as well as contact lithography, chemical etching, and the like.

Generally, the laser etching system 710 includes a solid state laser source 720 that directs a collimated beam 722 to a beam expander 724 and relay optics, e.g., a cylindrical lens 726 and objective lens 728. The beam 722 is then imaged as a vertical line onto the storage medium, in this example, tape 700. In one example, the laser source 720 is pulsed at a repetition rate of 10 KHz. Tape 700 may be passed through the etching system, e.g., between 25 and 100 inches per second, thereby creating a pattern of indicia on tape 700, and in particular, on a recording layer of tape 700, between approximately 64 and 254 $\mu m$. Of course, other tape speeds, repetition rates, and line spacing are possible and contemplated as described herein.

Additionally, the power density of laser source 720 is approximately 14 Amps, 2-3 $nJ/\mu m^2$, in one example. The power may be adjusted to etch various amounts of the recording layer, while not creating an undesirable heat affected zone or damaging underlying layers such as the base layer or the like.

Additionally, the laser pulses may be encoded as described above to create an encoded identification mark on the storage media. For example, data relating to the manufacture, date, and the like may be encoded into the non-erasable identification mark. Additionally, encoding may be performed at the media pancake level for high volume manufacturing.

Figure 8:
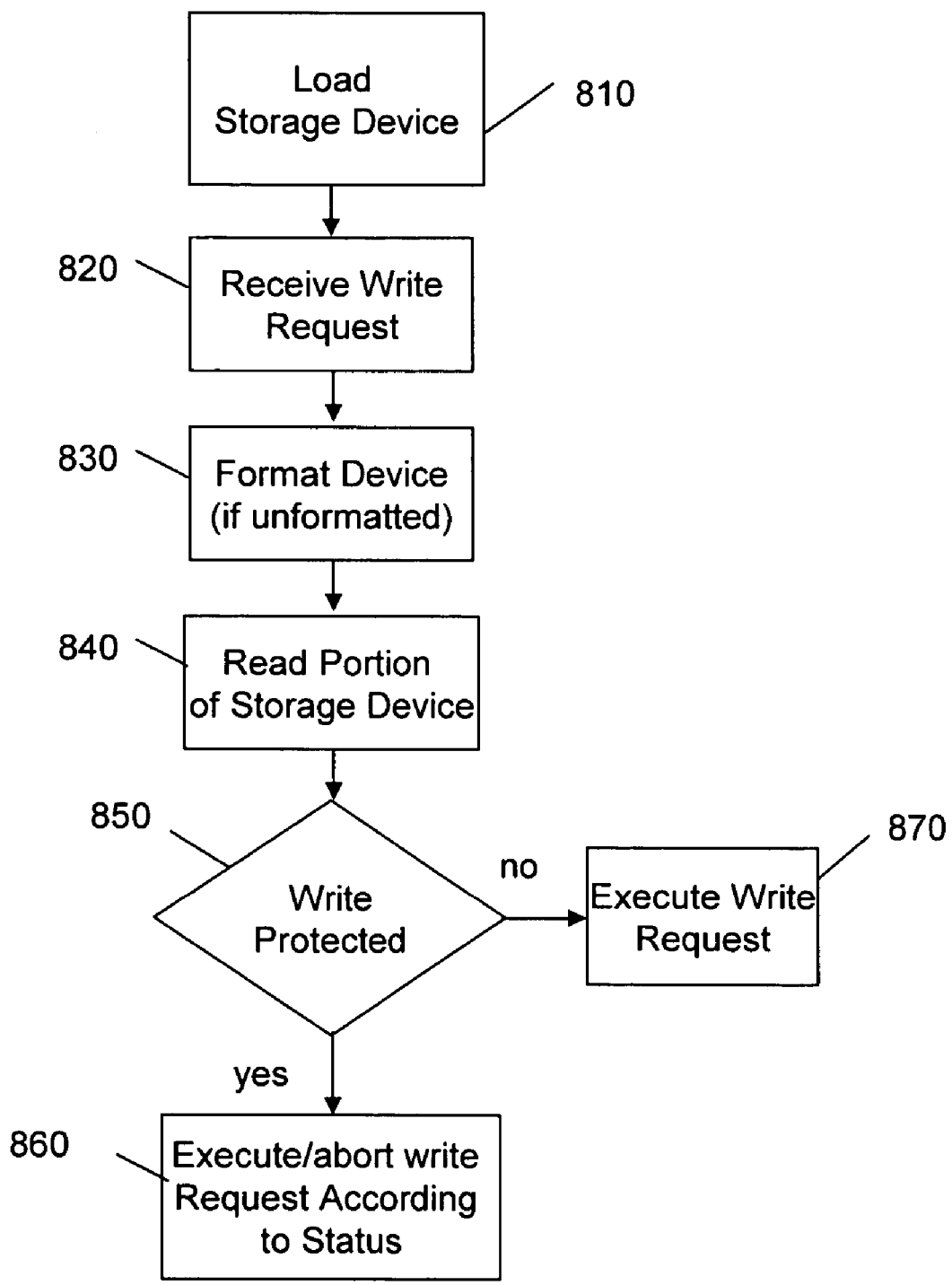
FIG. 8 illustrates an exemplary method for the operation of a storage drive system having a write protected mode and a standard write mode.

According to another aspect provided herein, methods for operating a magnetic media drive to identify and handle write protected storage devices are described. FIG. 8 illustrates one exemplary method for operating a magnetic media drive to format and read from or write to magnetic storage devices that may be write protected.

In one example, an unformatted storage device is loaded into a media drive system in block 810 in response to a write request received in block 820, which may also include accompanying write data to be written to the storage device. The system formats at least a portion of the storage device in block 830 by writing format data. For example, storage tape devices, e.g., DLT and SDLT cartridges, are generally manufactured in very high volume with no factory based tape related data (i.e., blank). Upon the first load and operation of a magnetic storage device in the drive system, the drive system formats the storage device for operation by writing certain calibration tracks, device based information, and other data such as directory information, alignment fields, and the like as described herein.

In one example, format information is written over a portion of the storage device that includes a write protected identification mark comprising a pattern of indicia (if present), for example, prior to the BOT marker. This method allows a drive to read the format data and determine if the storage device is write protected prior to writing the data per the write request. For example, after writing at least a portion of the format data, a portion of the format data is read by the drive in block 840. In particular, a read signal is generated and the drive determines if the device is write protected in block 850. As described, modulations or dropouts in the read signal may be detected to determine the status of the storage device. In instances, where the storage device was previously formatted, block 830 is skipped and the system proceeds directly to block 840 to read a portion of the data that would include the indication mark (if present), for example, the format data.

If the storage device is identified as a write protected device in block 850, the media drive proceeds to execute or abort the write request depending on the particular write protected scheme in block 860. For example, if the device is identified as a WORM device and the device has previously been written to, the write request may be aborted by the drive, thereby protecting the previously stored data. In other write protected schemes the drive may merely restrict the write request. For example, with a write append only scheme, the drive may space to an end of data marker (or the like) to write the data in a previously unwritten portion of the device while preserving previously written data (assuming the storage device is not full). Various other write protected schemes are possible and the drive may execute or abort the write request as desired.

If the storage device is not identified as a write protected device in block 850, the media drive proceeds to execute the write request in block 870. The write request may be executed in a conventional manner, and may overwrite previously stored information.

Those of ordinary skill in the art will recognized that various blocks depicted in FIG. 8 may be omitted or altered, that the blocks may be carried out in other sequential orders or in parallel, and additional or fewer actions are possible. For example, an unformatted storage device may be formatted and/or identified as write protected without receiving a write request, and block 830 may be omitted for previously formatted storage devices. Additionally, the exemplary methods and functionalities described may be implemented equivalently in one or more of software, firmware, hardware, or other available functional components or building blocks. Additionally, the exemplary methods may be embodied in computer readable storage medium capable of being directly or indirectly accessible by a storage system.

In addition to the above methods and systems, additional features may be included. In one example, anti piracy protection may be included in an auxiliary memory or emulated auxiliary memory ("EMAM") directory associated with the storage device by logging appropriate command sequences. In another example, tamper evident features such as storing a load count on the storage device, which is also stored with the storage system (e.g., the host) may be included. A difference in the storage device load count and system load count may indicate modifications to the stored data.

Furthermore, write protected storage devices as described may be difficult to identify as such without loading into a drive system. Accordingly, in one example, a sticker or other identifier may be provided to allow visual identification of these storage devices. In other examples, storage devices with different color housings may be used to identify the particular use. In other examples, tamper evident features may be included or added such as a sticker or seal that if broken indicate the storage device may have been compromised.

The above detailed description is provided to illustrate exemplary embodiments and is not intended to be limiting. It will be apparent to those of ordinary skill in the art that numerous modification and variations within the scope of the present invention are possible. Additionally, particular examples have been discussed and how these examples are thought to be advantageous or address certain disadvantages in related art. This discussion is not meant, however, to restrict the various examples to methods and/or systems that actually address or solve the disadvantages.

The invention claimed is:

1. A method for operating a magnetic storage media drive, the method comprising:
   - recording a signal over a pattern of one or more indicia associated with a recording layer of a magnetic storage medium,
   - generating a read signal from a read element associated with a transducer head, the read signal generated from at least a portion of the recorded signal;
   - determining if a modulation pattern is present in the read signal, the modulation pattern including a pattern of dropouts in the read signal associated with the pattern of one or more indicia, the modulation pattern indicating the storage medium is write protected.

2. The method of claim 1, wherein the pattern of indicia includes recessed regions in the recording layer.

3. The method of claim 1, further comprising receiving a write request and associated write data, and aborting the write request if the magnetic storage medium is determined to be write protected.

4. The method of claim 1, further comprising receiving a write request and associated write data, and writing the data if the storage medium is not write protected.

5. The method of claim 1, further comprising preventing the drive from overwriting previously written data stored on the storage medium if the storage medium is write protected.

6. The method of claim 1, wherein the modulation pattern is further encoded with data.

7. The method of claim 1, further comprising restricting write operations to the storage medium if the storage medium is write protected.

* * * * *